United States Patent
Brown et al.

(10) Patent No.: US 8,216,738 B2
(45) Date of Patent: Jul. 10, 2012

(54) DEACTIVATION OF SOFC ANODE SUBSTRATE FOR DIRECT INTERNAL REFORMING

(75) Inventors: Casey Brown, Calgary, Alberta (CA); Wei Dong, Calgary, Alberta (CA); Vlad Kalika, Gilroy, CA (US); Scott Sherman, Blackie, Alberta (CA); Scott Thompson, Calgary, Alberta (CA)

(73) Assignee: Versa Power Systems, Ltd., Calgary, Alberta (CA)

( * ) Notice: Subject to any disclaimer, the term of this patent is extended or adjusted under 35 U.S.C. 154(b) by 584 days.

(21) Appl. No.: 11/802,006

(22) Filed: May 18, 2007

(65) Prior Publication Data
US 2007/0287048 A1     Dec. 13, 2007

Related U.S. Application Data

(60) Provisional application No. 60/808,113, filed on May 25, 2006.

(51) Int. Cl.
  *H01M 8/24*  (2006.01)
  *H01M 8/06*  (2006.01)
  *H01M 8/04*  (2006.01)
(52) U.S. Cl. ........ 429/465; 429/425; 429/444; 429/495; 429/514
(58) Field of Classification Search ............ 204/280
  See application file for complete search history.

(56) References Cited

U.S. PATENT DOCUMENTS

| | | | | |
|---|---|---|---|---|
| 4,988,424 A * | 1/1991 | Woodward et al. | ...... | 204/192.29 |
| 5,486,428 A * | 1/1996 | Gardner et al. | ........... | 429/410 |
| 5,846,428 A * | 12/1998 | Martin et al. | ........... | 210/651 |
| 6,361,893 B1 * | 3/2002 | George et al. | ........... | 429/468 |
| 6,994,884 B1 * | 2/2006 | Guan et al. | ........... | 427/115 |
| 7,662,497 B2 * | 2/2010 | Lamp et al. | ........... | 429/454 |
| 2002/0081479 A1 * | 6/2002 | Kantak et al. | ........... | 429/34 |
| 2003/0180602 A1 * | 9/2003 | Finn et al. | ........... | 429/38 |

FOREIGN PATENT DOCUMENTS

WO    PCT/US07/08224    4/2007

OTHER PUBLICATIONS

U.S. Appl. No. 11/526,029, filed Sep. 25, 2006, Matthias Gottmann et al.

* cited by examiner

*Primary Examiner* — Melvin C Mayes
*Assistant Examiner* — Bijay Saha
(74) *Attorney, Agent, or Firm* — Bennett Jones LLP

(57) ABSTRACT

A SOFC includes a cathode electrode, a solid oxide electrolyte, an anode electrode, and a hydrocarbon fuel inlet. The SOFC is configured for internal reforming of a hydrocarbon fuel at the anode electrode. The SOFC is configured to limit an interaction between the hydrocarbon fuel and the anode electrode adjacent to the hydrocarbon fuel inlet, or to limit an area of the anode electrode exposed to the hydrocarbon fuel adjacent to the hydrocarbon fuel inlet, or to provide a gradual introduction of the hydrocarbon fuel to the anode electrode.

11 Claims, 10 Drawing Sheets

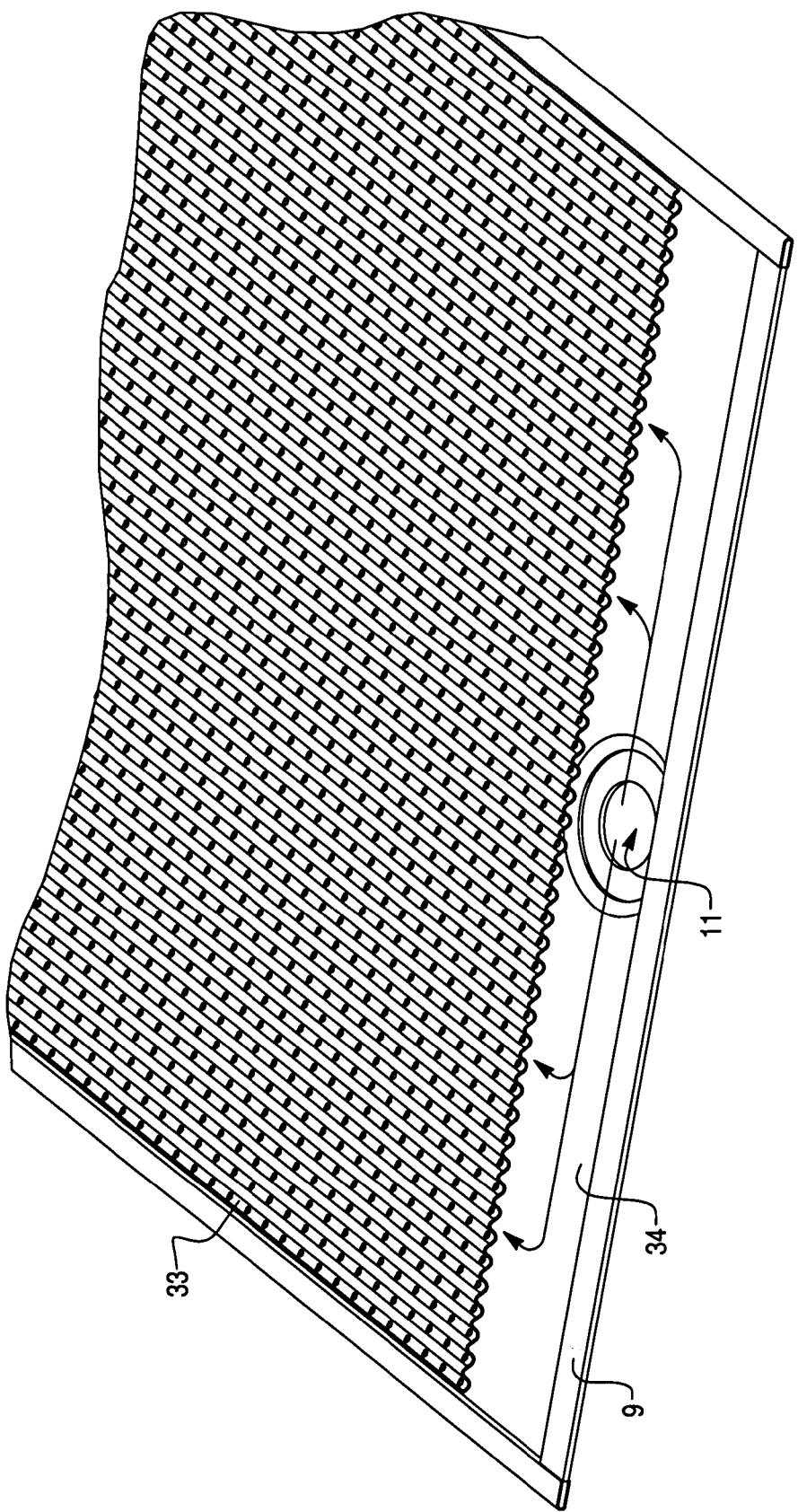

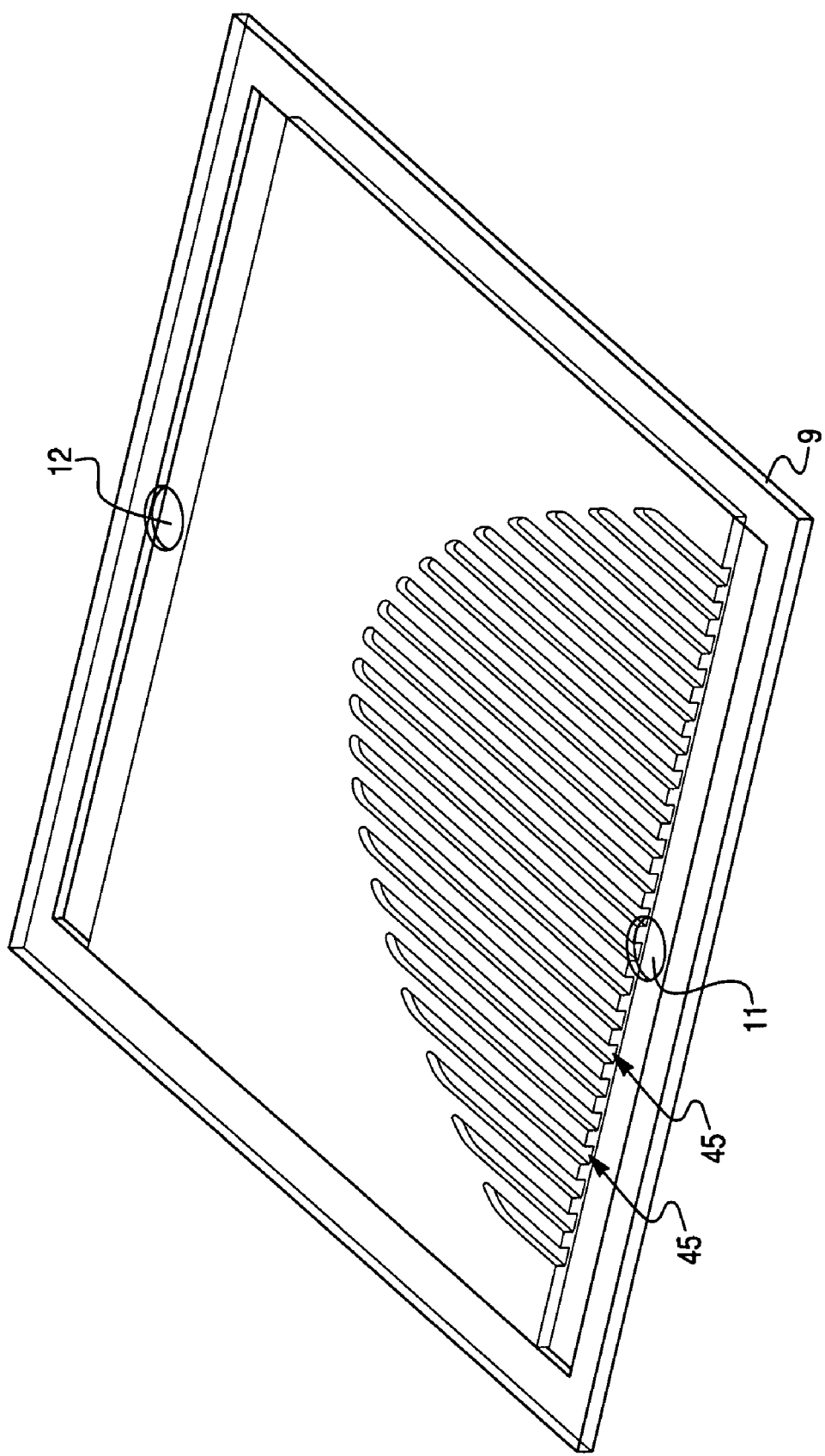

ly active surface, which can be large. One component of a fuel cell stack is the so called gas flow separator (referred to as a gas flow separator plate in a planar stack) 9 that separates the individual cells in the stack. The gas flow separator plate separates fuel, such as a hydrocarbon fuel,
DEACTIVATION OF SOFC ANODE SUBSTRATE FOR DIRECT INTERNAL REFORMING This application claims benefit of priority of U.S. Provisional Application Ser. No. 60/808,113, filed on May 25, 2006, which is incorporated herein by reference in its entirety.

BACKGROUND OF THE INVENTION

The present invention is generally directed to fuel cell components and more specifically to fuel cells configured for direct internal reforming.

In a high temperature fuel cell system, such as a solid oxide fuel cell (SOFC) system, an oxidizing flow is passed through the cathode side of the fuel cell while a fuel flow is passed through the anode side of the fuel cell. The oxidizing flow is typically air, while the fuel flow is a hydrocarbon fuel, such as methane, natural gas, pentane, ethanol, methanol, etc. The fuel cell, operating at a typical temperature between 750° C. and 950° C., enables the transport of negatively charged oxygen ions from the cathode flow stream to the anode flow stream, where the ion combines with either free hydrogen or hydrogen in a hydrocarbon molecule to form water vapor and/or with carbon monoxide to form carbon dioxide. The excess electrons from the negatively charged ion are routed back to the cathode side of the fuel cell through an electrical circuit completed between anode and cathode, resulting in an electrical current flow through the circuit.

As the solid oxide fuel cell technology progresses towards commercialization, the demand for higher power densities will lead to making SOFC systems more cost effective. This demand for higher power densities will cause elevated temperatures in the fuel cell stack. If this heat is not controlled, the interconnects of the fuel cell could melt.

Direct internal reforming of a hydrocarbon fuel to a hydrogen containing fuel within the stack at the SOFC anode (i.e., fuel) electrode is an effective way of cooling the fuel cell reaction site. In this type of reforming, an unreformed hydrocarbon fuel is provided to the anode to be reformed to a free hydrogen containing fuel, and an external reformer may be omitted. However, the reforming reaction at the anode electrode causes high localized thermal stresses. The traditional nickel based anodes are very reactive in the $CH_4$ reforming reaction at the temperatures under which the SOFC operates. The tendency is for the reforming reaction to take place very quickly upon entering the anode flow field, causing severe and in some cases catastrophic temperature gradients which could lead to fuel cell failure.

SUMMARY

A SOFC includes a cathode electrode, a solid oxide electrolyte, an anode electrode, wherein the SOFC is configured for internal reforming of a hydrocarbon fuel at the anode electrode, and a hydrocarbon fuel inlet. The SOFC is configured to limit an interaction between the hydrocarbon fuel and the anode electrode adjacent to the hydrocarbon fuel inlet, or to limit an area of the anode electrode exposed to the hydrocarbon fuel adjacent to the hydrocarbon fuel inlet, or to provide a gradual introduction of the hydrocarbon fuel to the anode electrode.

BRIEF DESCRIPTION OF THE DRAWINGS

FIGS. 6A, 6D and 6E is a three dimensional view of a fuel cell with a flow diversion plate according to one embodiment of the invention.

FIGS. 7A, 7B and 7C are three dimensional views of a portion of a fuel cell with a porous insert in the anode cavity according to an embodiment of the invention.

DETAILED DESCRIPTION OF THE PREFERRED EMBODIMENTS

The hydrocarbon fuel reforming reaction is endothermic whereas the electrochemical reaction is exothermic. If these two reactions are located in close proximity to each other at the anode electrode, possible fuel cell failure could result. Thus, in a SOFC configured for internal reforming of the hydrocarbon fuel at the anode electrode, the SOFC is configured to limit an interaction between the hydrocarbon fuel and the anode electrode adjacent to the hydrocarbon fuel inlet and/or to limit an area of the anode electrode exposed to the hydrocarbon fuel adjacent to the hydrocarbon fuel inlet and/or to provide a gradual introduction of the hydrocarbon fuel to the anode electrode. Such configuration(s) reduce the temperature gradients, thermal stresses and shock at the anode electrode near the fuel inlet, thus reducing the amount of fuel cell failure.

Figure 1A:
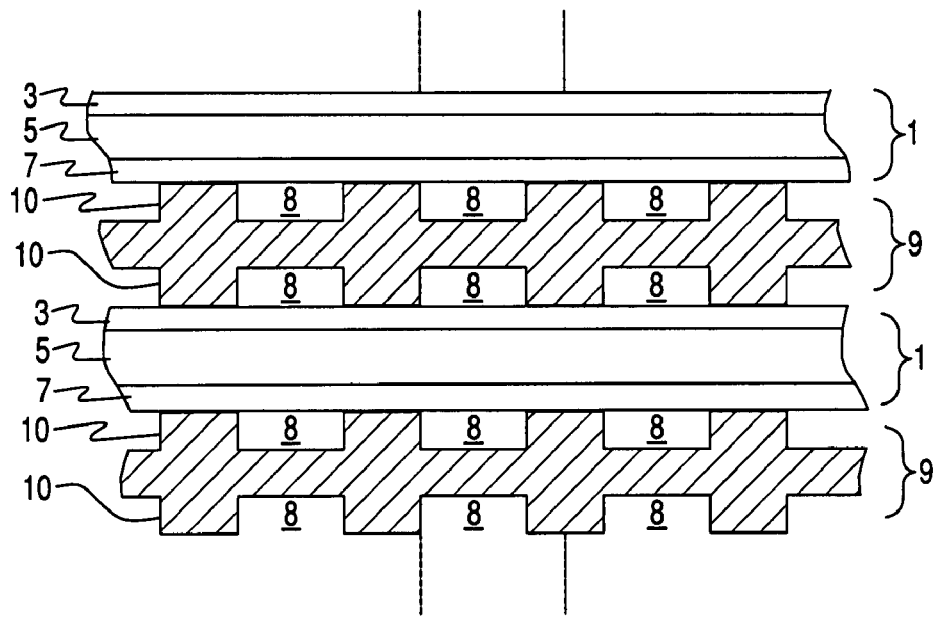
FIG. 1A is a side cross sectional view of a fuel cell stack according to one embodiment of the invention.

FIG. 1A illustrates a side cross-sectional view of a SOFC stack, in which each SOFC 1 comprises an anode electrode 3, a solid oxide electrolyte 5 and a cathode electrode 7. The anode may comprise a cermet, such as a cermet containing a metal phase comprising nickel and/or a noble metal (such as Pt, etc.), and a ceramic phase comprising zirconia, yttria, stabilized zirconia (such as yttria, scandia and/or other stabilized zirconia), ceria, doped ceria (such as ceria doped with an oxide of lanthanum, gadolinium, thorium and/or zirconium) and/or other ceramic materials. The electrolyte may comprise a stabilized zirconia, such as a yttria and/or scandia stabilized zirconia, a doped ceria and/or other ionically conductive ceramics. The cathode may comprise an electrically conductive perovskite, such as lanthanum strontium manganite (LSM), lanthanum strontium cobaltite (LSCo), as well as other conductive lanthanum oxides, such as ferrites, nickelites and chromites.

Fuel cell stacks are frequently built from a multiplicity of SOFC's 1 in the form of planar elements, tubes, or other geometries. Fuel and air has to be provided to the electrochemically active surface, which can be large. One component of a fuel cell stack is the so called gas flow separator (referred to as a gas flow separator plate in a planar stack) 9 that separates the individual cells in the stack. The gas flow separator plate separates fuel, such as a hydrocarbon fuel, flowing to the fuel electrode (i.e., anode) of one cell in the stack from oxidant, such as air, flowing to the air electrode (i.e., cathode) of an adjacent cell in the stack. The separator 9 shown in FIG. 1A contains gas flow passages or channels 8 between ribs 10. Frequently, the gas flow separator plate 9 is also used as an interconnect which electrically connects the fuel electrode of one cell to the air electrode of the adjacent cell. In this case, the gas flow separator plate which functions as an interconnect is made of or contains an electrically conductive material. FIG. 1A shows that the lower SOFC 1 is located between two gas separator plates 9.

Figure 1B:
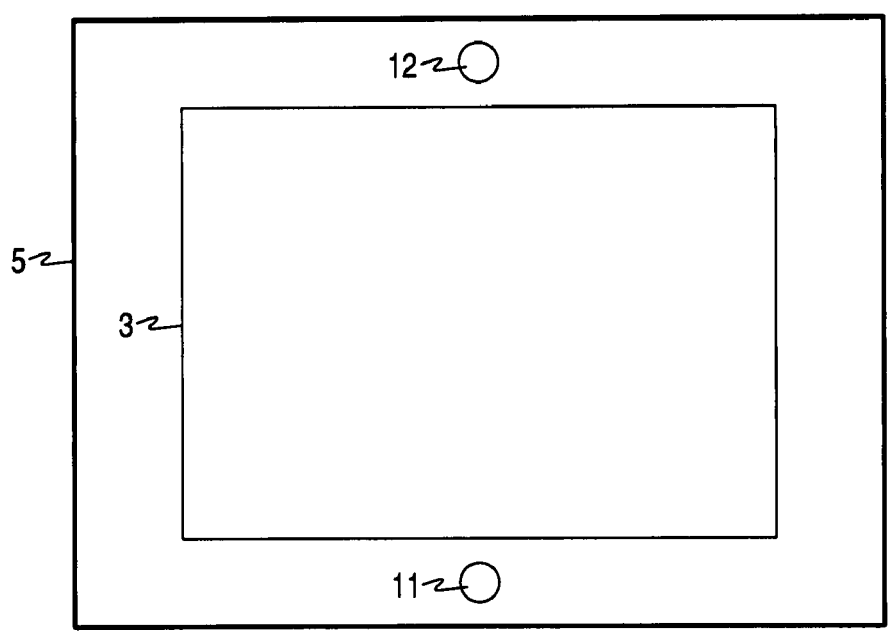
FIG. 1B is a top view of an example of an electrolyte supported SOFC according to one embodiment of the invention.

Each SOFC contains a hydrocarbon fuel inlet 11. In stacks which are internally manifolded for fuel, the fuel inlet 11 comprises a fuel inlet riser opening. A fuel inlet riser is a series of connected openings through the gas separator plates and/or through one or more layers of the SOFC, such as the anode, cathode and/or electrolyte. For example, FIG. 1B shows a top view of an example of an electrolyte supported SOFC 1 in which the fuel inlet opening 11 extends through the electrolyte 5. However, for electrode supported fuel cells, the opening 11 may extend through the anode or cathode electrode instead. For stacks which are externally manifolded for fuel, the fuel inlet 11 comprises an opening between the external fuel manifold and the anode flow cavity or chamber. The SOFC also contains a corresponding fuel outlet 12.

In a first embodiment of the invention, the anode electrode contains a non-uniform profile which is exposed to the hydrocarbon fuel adjacent to the fuel inlet. The anode 3 preferably contains a smaller reformation reaction area adjacent to the fuel inlet 11 than adjacent to the fuel outlet 12.

Figure 2A:
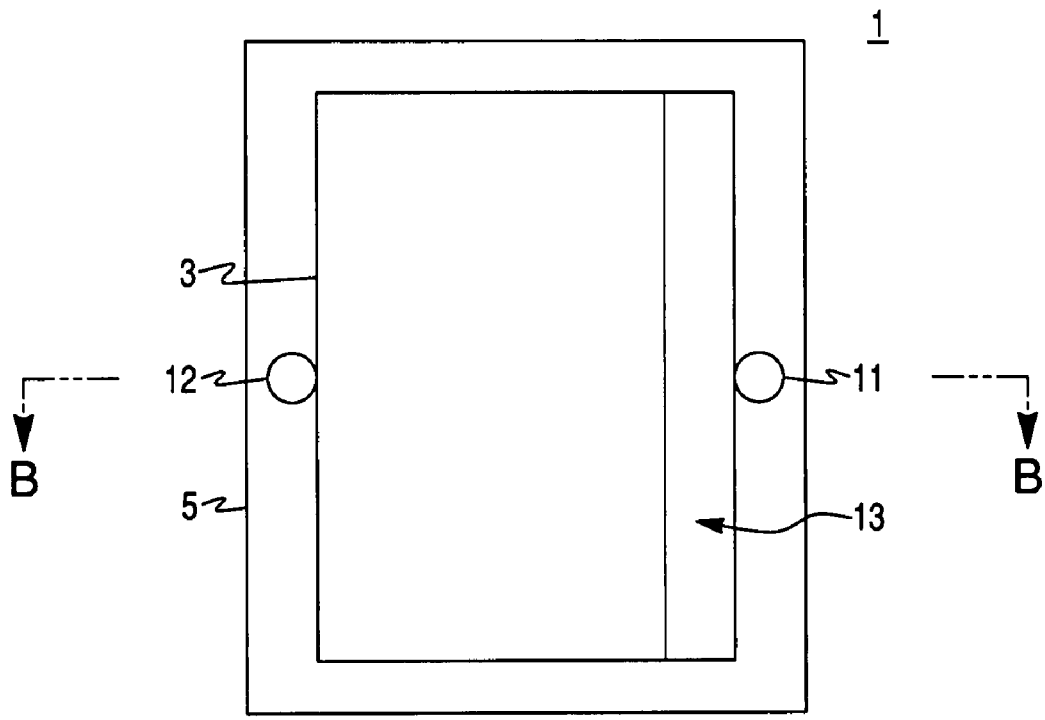
FIGS. 2A and 2B are top and side cross sectional views, respectively, of a SOFC with a gradient mask according to one embodiment of the invention.
Figure 2B:

In a first configuration of the first embodiment, a gradient mask 13 is formed over the anode electrode 3 adjacent to the fuel inlet 11. FIGS. 2A and 2B illustrate a top view and a side cross sectional view along line B-B, respectively, of a gradient mask 13. The thickness of the electrodes 3, 7 has been exaggerated in these Figures for illustrative purposes. As shown in these Figures, the mask 13 has a variable or gradient thickness. The mask 13 is thicker closer to the fuel inlet 11 and thinner as it extends in a direction away from the fuel inlet 11. The thickness of the mask 13 may have a diagonally sloping or a stepped thickness profile.

The mask 13 may be configured such that does not cover a portion of the anode electrode 3. For example, as shown in FIGS. 2A and 2B, the mask 13 extends less than 50%, such as less than 33%, such as less than 25% of the length of the anode 3 as measured from the fuel inlet 11 towards the fuel outlet 12.

Applying the masking material 13 onto the fuel cell anode electrode 3 will deactivate the hydrocarbon fuel, such as the $CH_4$ fuel reforming reaction. Preferably, the mask 13 is made of a material that is porous to the hydrocarbon fuel. In this case, some but not all of the hydrocarbon fuel being provided from the fuel inlet 11 can reach the anode electrode 3 under the mask 13 and react with the anode to form a free hydrogen containing fuel. For example, because of the variable thickness of the mask more fuel can reach the anode 3 under the thinner than under the thicker regions of the mask 13. For example, the thicker regions of the mask 13 may block 50 to 90% of the fuel from reaching the anode 3, while the thinner regions of the mask 13 may block 5 to 50% of the fuel from reaching the anode 3.

The material of the mask 13 can be applied using a screen printing process, a spraying process or other layer deposition processes over the anode electrode in the desired location(s). Thus, the mask 13 may comprise a deposited layer of any material which can at least partially block the fuel flow and which can withstand the SOFC operating temperatures and which would not interfere with the reformation and electrochemical reactions at the anode 3.

In a second configuration of the first embodiment, a mask 23 has a sharp pattern in addition to or instead of the gradient profile. The mask 23 covers a part of the anode electrode 3 adjacent to the fuel inlet 11 such that a leading edge of the exposed portion of the anode electrode 3 by the mask forms a non-straight line facing the fuel inlet. In other words, the mask covers a first portion of the anode 3 adjacent to the fuel inlet to expose a second portion of the anode 3 adjacent to the fuel inlet 11, such that the fuel reformation reaction occurs only at the second portion of the anode 3 adjacent to the fuel inlet 11. Since the first portion of the anode 3 adjacent to the fuel inlet 11 is covered by the mask, this limits the interaction between the hydrocarbon fuel and the anode electrode adjacent to the hydrocarbon fuel inlet and limits an area of the anode electrode exposed to the hydrocarbon fuel adjacent to the hydrocarbon fuel inlet.

Figure 3A:
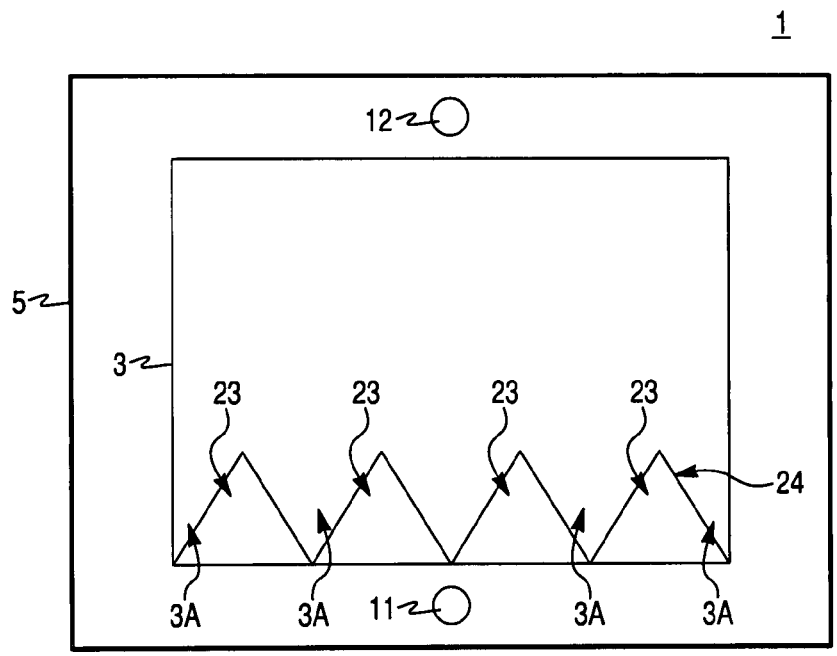
FIGS. 3A and 3B are top views of a SOFC with a shaped mask according to one embodiment of the invention.

For example, as shown in a top view of a SOFC 1 in FIG. 3A, the mask 23 covers a first portion of the anode 3 to leave a second saw tooth shaped portion 3A of the anode 3 exposed to the fuel adjacent to the fuel inlet 11. Thus, the leading edge 24 of the anode 3 exposed to the fuel forms zig-zag non-straight line.

Figure 3B:
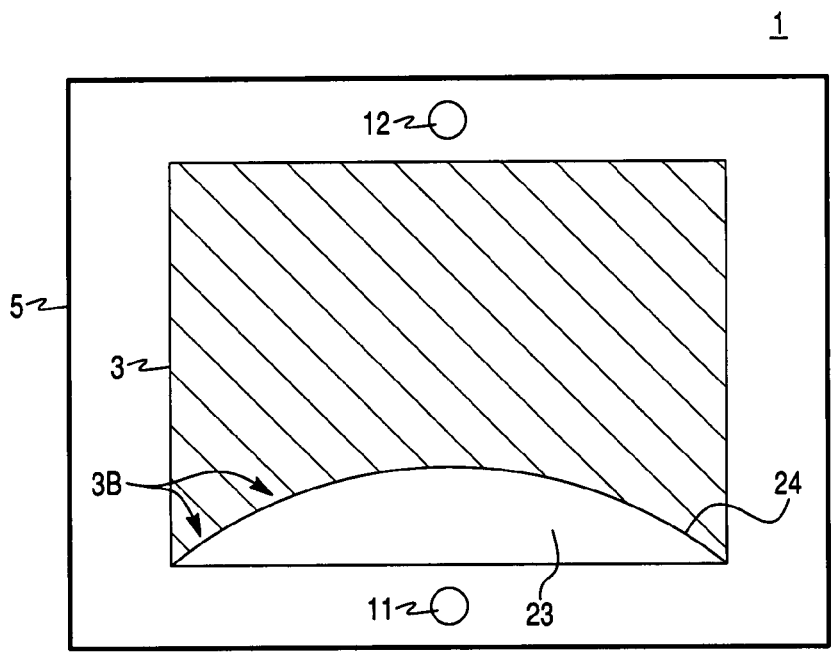

However, the mask 23 does not necessarily have to have a saw tooth shape. For example, the mask 23 may have a battlement (i.e., square protrusion) or sine-wave type shape. FIG. 3B shows another configuration of the mask 23, in which the mask has a semi-circular shape. The mask 23 leaves exposed to the fuel inlet stream a crescent shaped portion 3B of the anode 3 located adjacent to the fuel inlet 11. Thus, the leading edge 24 of the anode 3 exposed to the fuel forms a curved (such as half oval or half-circle) non-straight line. This configuration is advantageous in that the leading edge of the anode 3 is about equidistant from a fuel riser type fuel inlet 11. In this case, the anode lacks a small area which is closest to the fuel riser type fuel inlet which may be subjected to most severe thermal gradients.

The mask 23 of the second configuration may have a uniform or a gradient thickness. The mask 23 may comprise the same or different material from mask 13 and may be deposited by the same or different method as mask 13. The mask 23 may be patterned into a desired shape either during deposition (such as by patterned screen printing) or post deposition by any suitable layer patterning method known in the art, such as by scraping, laser ablation or photolithographic masking and etching. The mask 23 may be porous or non-porous to the fuel inlet stream. The mask may be made of an electrically conducting material. The mask may also be made of an electrically insulating material if the mask does not cover the entire anode surface to allow an electrical connection to the anode.

Figure 4:
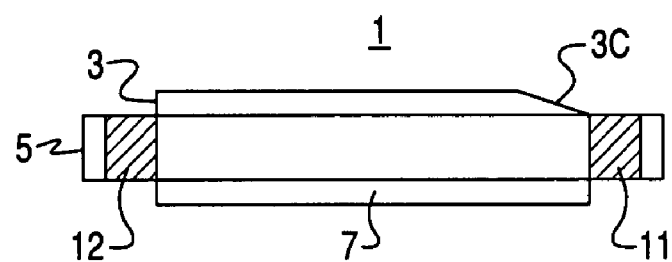
FIG. 4 is a side cross sectional view of a SOFC with a gradient anode profile according to one embodiment of the invention.

In the third configuration of the first embodiment, the anode 3 itself has a gradient profile. In other words, rather than using a gradient mask 13, the anode 3 itself has a non-uniform thickness. As shown in the side-cross sectional view of FIG. 4, the anode 3 has a smaller thickness closer to the fuel inlet 11 than farther away from the fuel inlet 11. In other words, the anode thickness adjacent to the fuel inlet 11 increases in a direction from the fuel inlet 11 to the fuel outlet 12. The anode thickness may increase away from the fuel inlet 11 monotonically or in steps. As shown in FIG. 4, the portion of the anode 3 away from the fuel inlet 11 may have a uniform thickness. The gradient thickness portion 3C of the anode 3 may be formed by any suitable method during deposition (such as by depositing more anode sublayer(s) away from the fuel inlet than adjacent to the fuel inlet) or post deposition by any suitable cermet layer patterning method known in the art, such as by scraping, laser ablation or photolithographic masking and etching.

In a fourth configuration of the first embodiment, the anode 3 itself has a sharp pattern in addition to or instead of the gradient thickness profile. The leading edge of the exposed portion of the anode electrode 3 forms a non-straight line facing the fuel inlet 11 without using a mask 23.

Figure 5A:
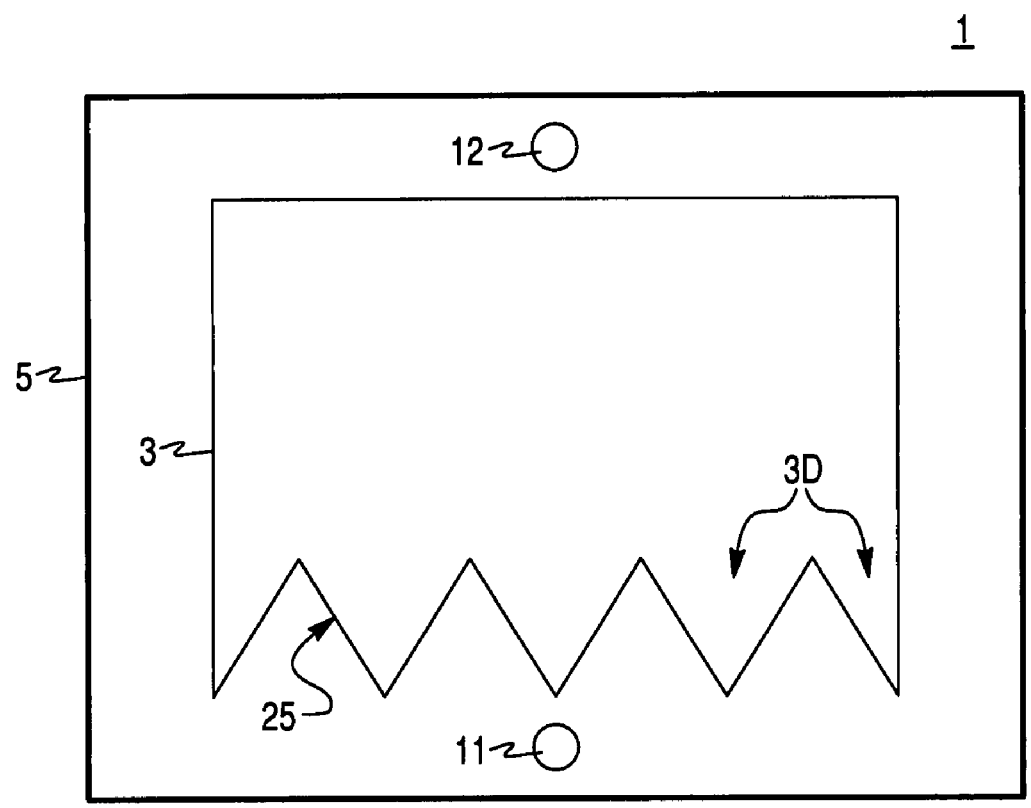
FIGS. 5A and 5B are top views of a SOFC with a shaped anode profile according to one embodiment of the invention.
Figure 5B:
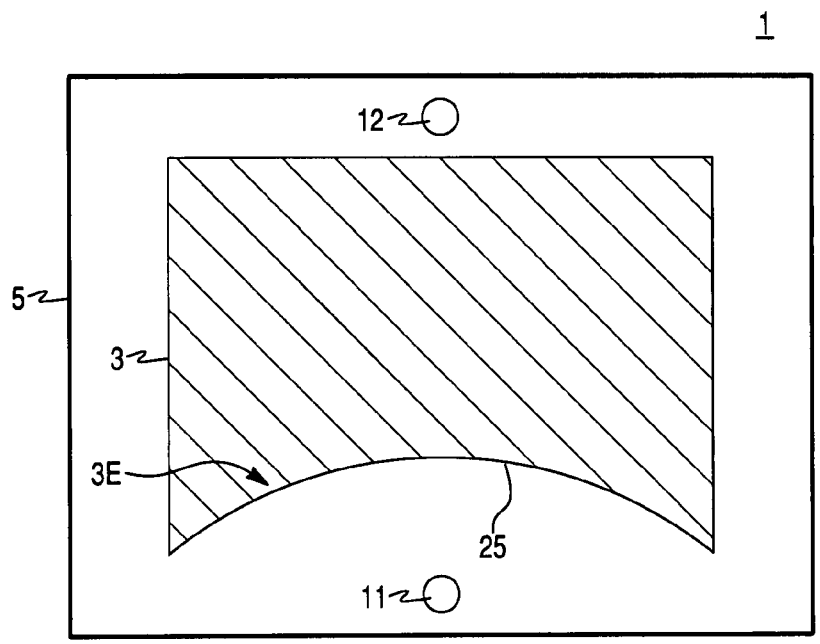

For example, as shown in FIG. 5A, the anode portion 3D adjacent to the fuel inlet 11 has a saw tooth shape. Thus, the leading edge 25 of the anode 3 exposed to the fuel forms zig-zag non-straight line. However, the anode portion does not necessarily have to have a saw tooth shape. For example, the anode portion 3D may have a battlement shape (i.e., square protrusion) or a sine-wave type shape. FIG. 5B shows another configuration of the anode 3, in which the anode portion 3E adjacent to the fuel inlet 11 has a crescent shape. Thus, the leading edge 25 of the anode 3 exposed to the fuel inlet stream forms a curved (such as half oval or half-circle) non-straight line. This configuration is advantageous in that the leading edge of the anode 3 is about equidistant from a fuel riser type fuel inlet 11. In this case, the anode lacks a small area which is closest to the fuel riser type fuel inlet which may be subjected to most severe thermal gradients.

The patterned anode 3 may be formed by any suitable method during deposition or post deposition by any suitable cermet layer patterning method known in the art, such as by scraping, laser ablation or photolithographic masking and etching. One method to form the patterned anode 3 in an electrolyte supported SOFC is to selectively print the nickel oxide only over the desired area.

In a second embodiment of the invention, a fuel stream diversion plate is used with the SOFC. Inserting a fuel diversion plate into the fuel cell anode flow cavity or chamber will control where and how much of the hydrocarbon fuel reforming reaction occurs. The diversion plate allows less fuel to the reach a first portion of the anode closer to the fuel inlet 11 than a second portion of the anode farther from the fuel inlet 11 and closer to the fuel outlet 12.

Figure 6A:
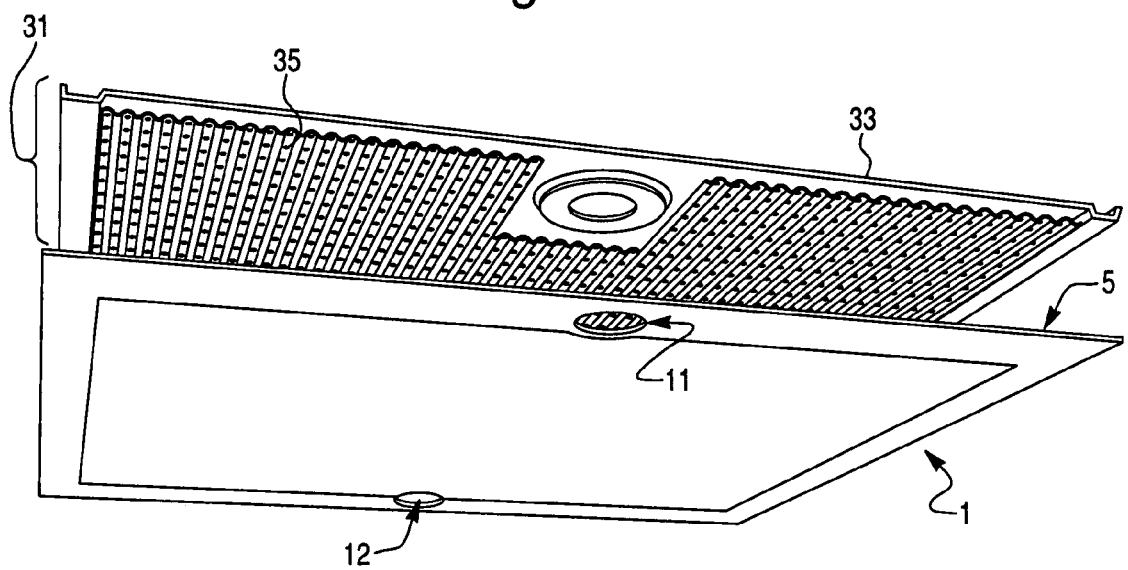

In one configuration of the second embodiment shown in a three dimensional view in FIG. 6A, the diversion plate 33 is located in the anode cavity 31 between the anode electrode 3 and the adjacent gas separator plate 9 (shown in FIG. 1A). The plate 33 comprises a corrugated plate with a plurality of openings 35, such as round holes. However, other shaped openings 35, such as oval, polygonal or irregularly shaped openings can be used. Preferably, the plate has a defined hole spacing or hole diameter change as the fuel proceeds through the anode cavity. This pattern could be sharply defined (i.e., change in steps) or a continuous gradient. The plate 33 can be made of steel or other suitable electrically conductive materials which can withstand the SOFC operating temperature and which do not react with the hydrocarbon fuel. While the plate 33 is shown in FIG. 6A as extending over the entire anode, the plate 33 may extend only partially over the anode 3 and may terminate before it reaches the end of the anode adjacent to the fuel outlet 12.

The corrugated plate allows a first portion of the fuel inlet stream from the fuel inlet 11 to travel under the corrugations directly to the portion of the anode 3 adjacent to the fuel inlet 11, while a second portion of the fuel inlet stream travels above the corrugations and is introduced through the openings 35 to the portions of the anode 3 that are further away from the fuel inlet 11.

For a corrugated plate 33 with evenly spaced corrugations, about 50% of the fuel inlet steam travels directly to the anode electrode 3 and about 50% of the fuel inlet stream bypasses and is introduced back to the anode 3 at any location through the openings 35. However, the height and/or width of the corrugations may be unevenly spaced, with the upward facing corrugations being narrower/shorter or wider/higher than the downward facing corrugations. In this case, more than or less than 50% of the inlet fuel stream, respectively, travels directly to the anode 3 adjacent to the fuel inlet 11. It should also be noted that while FIG. 6A shows corrugations with rounded tips, the tips may have sharp or flat points. Furthermore, the plate 33 may comprise a flat rather than a corrugated plate with openings 35, which is arranged in the anode cavity 31 such that at least some of the fuel inlet stream passes between the plate 33 and the gas separator plate 9. For example, as shown in FIG. 6E, the plate 33 may be fitted into a recess in the gas separator plate 9. A fuel distribution manifold 34 may be formed by the portion of the recess exposed laterally from the fuel inlet 11 to allow the fuel to be distributed to all corrugations in the plate 33, as shown by the arrows in FIG. 6E.

Figure 6B:
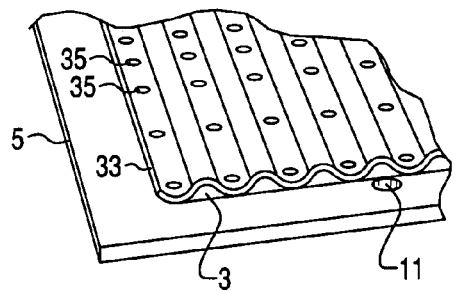
FIGS. 6B and 6C are three dimensional views of a portion of a flow diversion plate according to alternative embodiments of the invention.
Figure 6C:
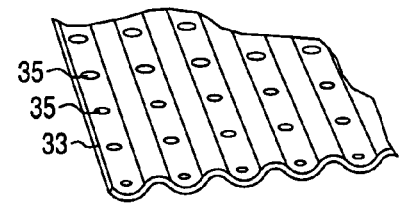
Figure 6D:
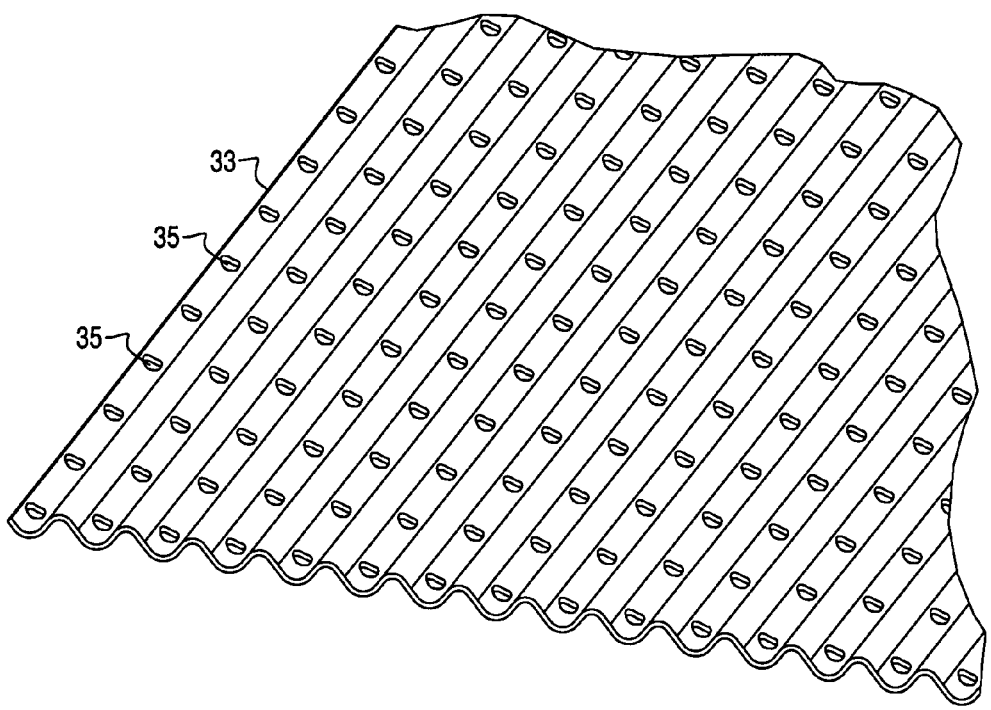

FIGS. 6A and 6D illustrate a plate 33 in which the opening 35 spacing and size is uniform. However, there are no openings 35 in the front portion of the plate 33 which is located adjacent to the fuel inlet 11. Thus, the plurality of openings are located throughout the fuel diversion plate except in a portion adjacent to the hydrocarbon fuel inlet. This portion may extend for example 10 to 30% of the length of the plate 33 from the fuel inlet 11 to the fuel outlet 12.

FIG. 6B illustrates a three dimensional view of another plate 33 configuration in which the openings 35 are spaced father apart from each other in a first portion of the plate 33 adjacent to the fuel inlet 11 than in a second portion of the plate adjacent to the fuel outlet 12. The opening 35 spacing may be decreased from the inlet 11 to the outlet 12 side gradually or in sharp steps.

FIG. 6C illustrates another plate 33 configuration in which the openings 35 are smaller in size (such as smaller in diameter for round holes) in a first portion of the plate 33 adjacent to the fuel inlet 11 than in a second portion of the plate adjacent to the fuel outlet 12. The opening 35 size may be decreased from the inlet 11 to the outlet 12 side gradually or in sharp steps. If desired, the opening 35 size and spacing may be varied together, with smaller and wider spaced apart openings 35 located in the first portion of the plate closer to the fuel inlet 11 and with larger and narrower spaced apart openings 35 located in the second portion of the plate closer to the fuel outlet 12.

Figure 7A:
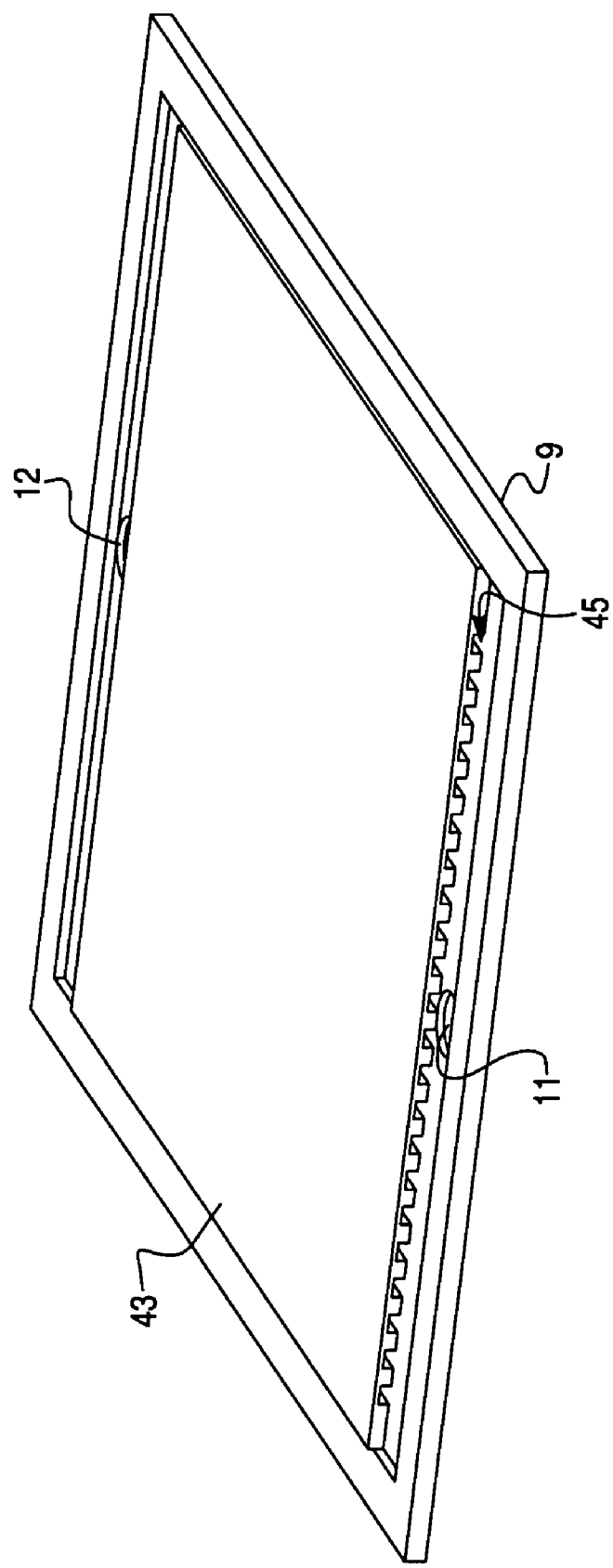
Figure 7B:
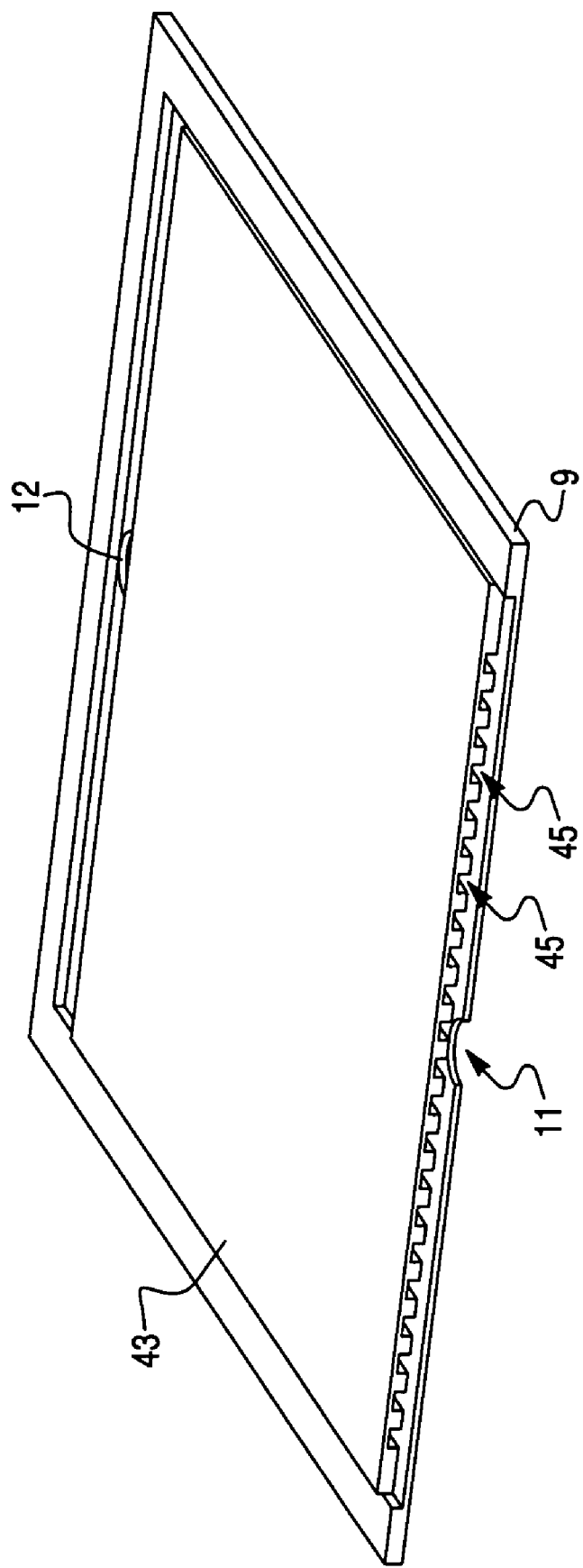

In a third embodiment of the invention, a porous insert 43 is provided into the anode cavity 31 instead of the diversion plate 33. Preferably, the insert 43 has a network of low pressure drop channels 45 (relative to the porous media) on the surface mated to the gas separator plate 9, as shown in FIG. 7A. FIG. 7B is a cut away view through FIG. 7A. The upper surface of the insert 43 shown in FIG. 7A contacts the anode of the SOFC. The flow cavities 45 allow a portion of the fuel inlet gas stream to bypass the anode entrance of the SOFC thus allowing for fresh fuel to be distributed further down the anode side of the cell.

The channels 45 does not necessarily have to extend the whole length of the insert 43. For example, the channel geometry may be configured by modeling to optimize gas flow, temperature, and performance (utilization). FIG. 7C shows an example of one channel 45 geometry having a curved or stepped profile, in which the channels in the middle of the insert 43 extend farther back toward the fuel outlet 12 than channels on the edges of the insert. FIG. 7C is an upside down view compared to the view shown in FIGS. 7A and 7B and the gas separator 9 is transparent in the illustration in FIG. 7C to show the shape of the flow channels 45.

The insert 43 may be made of any suitable material which is porous or semi-porous to the inlet fuel gas stream, which can withstand the SOFC operating temperature and which does not react with the fuel stream. Preferably, the insert is electrically conductive and may be made of a metallic material, such as a porous metal felt. The insert 43 may have a plate shape or any other suitable shape. The insert 43 may be shaped by stamping or pressing or by other suitable methods. The insert 43 may extend over all or part of the anode. For example, the insert 43 may extend over a part of the anode, such as over 5 to 50% of the anode, including 10 to 30% of the anode.

Alternatively, the flow channels 45 in the insert 43 may be omitted. Instead, the channels may be formed in the surface of the gas separator plate 9 which contacts the insert 43. For example, a grooved or ribbed gas separator plate surface shown in FIG. 1A provides gas flow channels 8 between the gas separator plate 9 and the insert 43. The insert 43 allows for a gradual introduction of the active fuel to the surface of the anode thus distributing the reforming reaction and resultant cooling over a larger cell surface area.

Thus, the embodiments of the invention provide the ability to distribute fresh fuel over larger surface areas of the cell to reduce thermal shock. It should be noted that the embodiments of the invention may be used together in the same fuel cell stack. For example, any combination of two, three or all four of the above described anode mask 23, patterned anode 3, diversion plate 33 and insert 43 may be used in the same stack. Furthermore, it should be noted that the terms such as up, down, over, under, above and below are used to illustrate the various configurations and should not be considered limiting on the scope of the invention. Obviously when a fuel cell is turned upside down, these directions change without changing the nature of the fuel cell.

U.S. application Ser. No. 10/369,133 filed Feb. 20, 2003 is incorporated by reference herein in its entirety. The foregoing description of the invention has been presented for purposes of illustration and description. It is not intended to be exhaustive or to limit the invention to the precise form disclosed, and modifications and variations are possible in light of the above teachings or may be acquired from practice of the invention. The drawings are not necessarily to scale and illustrate the device in schematic block format. The drawings and description of the preferred embodiments were chosen in order to explain the principles of the invention and its practical application, and are not meant to be limiting on the scope of the claims. It is intended that the scope of the invention be defined by the claims appended hereto, and their equivalents.

The invention claimed is:

1. A SOFC, comprising:
a cathode electrode;
a solid oxide electrolyte;
an anode electrode;
a hydrocarbon fuel inlet; and
further comprising at least one of:
(a) porous gradient mask located over at least a portion of the anode electrode at least adjacent to the hydrocarbon fuel inlet;
(b) a mask located over a first portion of the anode electrode adjacent to the hydrocarbon fuel inlet such that a leading edge of a second portion of the anode electrode exposed by the mask forms a non-straight line facing the hydrocarbon fuel inlet;
(c) the anode electrode comprising a smaller thickness in a first portion closer to the hydrocarbon fuel inlet than in a second portion farther away from the hydrocarbon fuel inlet; or
(d) a fuel stream diversion plate located in an anode flow cavity, wherein the fuel stream diversion plate comprises a corrugated plate defining a plurality of openings.

2. The SOFC of claim 1 which comprises two or more of elements (a) to (d).

3. The SOFC of claim 1 comprising a porous gradient mask located over at least a portion of the anode electrode adjacent to the hydrocarbon fuel inlet, wherein a thickness of the gradient mask decreases in a direction from the hydrocarbon fuel inlet to a fuel outlet.

4. The SOFC of claim 3, wherein the gradient mask extends less than 50% of a length of the anode electrode as measured from the hydrocarbon fuel inlet toward the fuel outlet.

5. The SOFC of claim 1 comprising a mask located over a first portion of the anode electrode adjacent to the hydrocarbon fuel inlet such that a leading edge of a second portion of the anode electrode exposed by the mask forms a non-straight line facing the hydrocarbon fuel inlet.

6. The SOFC of claim 1, wherein the anode electrode has a smaller thickness in a first portion closer to the hydrocarbon fuel inlet than in a second portion farther away from the hydrocarbon fuel inlet.

7. The SOFC of claim 1, comprising a fuel stream diversion plate located in an anode flow cavity, wherein the fuel stream diversion plate comprises a corrugated plate defining a plurality of openings.

8. The SOFC of claim 7, wherein the plurality of openings are located throughout the fuel diversion plate except in a portion adjacent to the hydrocarbon fuel inlet.

9. The SOFC of claim 7, wherein the plurality of openings are spaced farther apart from each other in a first portion of the fuel diversion plate adjacent to the hydrocarbon fuel inlet than in a second portion of the fuel diversion plate adjacent to a fuel outlet.

10. The SOFC of claim 7, wherein the plurality of openings have a smaller size in a first portion of the fuel diversion plate adjacent to the hydrocarbon fuel inlet than in a second portion of the fuel diversion plate adjacent to a fuel outlet.

11. A method of operating a SOFC which comprises a cathode electrode, a solid oxide electrolyte, an anode electrode, and a hydrocarbon fuel inlet, said method comprising the steps of:
(a) providing a hydrocarbon fuel to the anode electrode and reforming the hydrocarbon fuel at the anode electrode,
(b) dispersing the hydrocarbon fuel over the anode electrode with a:
  i. porous gradient mask located over at least a portion of the anode electrode at least adjacent to the hydrocarbon fuel inlet;
  ii. a mask located over a first portion of the anode electrode adjacent to the hydrocarbon fuel inlet such that a leading edge of a second portion of the anode electrode exposed by the mask forms a non-straight line facing the hydrocarbon fuel inlet;
  iii. the anode electrode comprising a smaller thickness in a first portion closer to the hydrocarbon fuel inlet than in a second portion farther away from the hydrocarbon fuel inlet; or
  iv. a fuel stream diversion plate located in an anode flow cavity, wherein the fuel stream diversion plate comprises a corrugated plate defining a plurality of openings.

* * * * *